(12) United States Patent
Trotter et al.

(10) Patent No.: US 8,509,211 B2
(45) Date of Patent: Aug. 13, 2013

(54) WIRELESS AUDIO COMMUNICATING METHOD AND COMPONENT

(75) Inventors: John Trotter, Sudbury, MA (US); Mark R. Hickman, Sudbury, MA (US); Dmitriy Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 868 days.

(21) Appl. No.: 12/491,470

(22) Filed: Jun. 25, 2009

(65) Prior Publication Data

US 2010/0329235 A1 Dec. 30, 2010

(51) Int. Cl.
*H04J 3/24* (2006.01)
(52) U.S. Cl.
USPC ............................ 370/349; 370/462
(58) Field of Classification Search
USPC ................ 370/321–322, 328–329, 331, 345, 370/347–349, 437, 442–445, 447, 458–459, 370/461–462
See application file for complete search history.

(56) References Cited

U.S. PATENT DOCUMENTS

| 5,418,784 | A  | * | 5/1995 | Ramakrishnan et al. | 370/445 |
| 6,097,705 | A  | * | 8/2000 | Ben-Michael et al. | 370/315 |
| 6,226,290 | B1 | * | 5/2001 | Salett et al. | 370/389 |
| 6,661,804 | B2 | * | 12/2003 | Fellman et al. | 370/420 |
| 6,751,231 | B2 | * | 6/2004 | Fellman et al. | 370/437 |
| 2003/0076855 | A1 | * | 4/2003 | Chamberlain | 370/447 |
| 2004/0266350 | A1 | * | 12/2004 | Kim | 455/41.2 |
| 2007/0076907 | A1 | * | 4/2007 | Stagni et al. | 381/124 |
| 2007/0242839 | A1 |   | 10/2007 | Kim et al. | |
| 2009/0067448 | A1 | * | 3/2009 | Stanwood et al. | 370/447 |
| 2010/0130129 | A1 | * | 5/2010 | Chang et al. | 455/41.2 |
| 2012/0030353 | A1 | * | 2/2012 | Balogh | 709/224 |

FOREIGN PATENT DOCUMENTS

| EP | 1119137 A1 | 7/2001 |
| EP | 1739788 A1 | 1/2007 |
| EP | 1890431 A2 | 2/2008 |
| WO | 2008070777 A2 | 6/2008 |

OTHER PUBLICATIONS

GE Bluetooth Home Stereo Transmitter & Receiver User Manual, 8 pages, 2006 JASCO Products. A one paragraph description of this product by Applicants is also provided.
A document containing applicant's summary of the GE Bluetooth Home Stereo Transmitter & Receiver, 1 pg, 2006.

(Continued)

*Primary Examiner* — Kevin Mew
(74) *Attorney, Agent, or Firm* — Bose Corporation

(57) ABSTRACT

A method of reducing interference by a first wireless audio communication system with a second wireless communication system that is different from the first wireless system is provided. The first wireless system is caused to transmit data packets with a time gap between packets during which the first wireless system is not transmitting. Periodically a long time gap between two packets of the first system is set to be at least as long as a longest time it can take the second wireless system to transmit a data packet even when packet transmission errors are occurring in the first wireless system such that if packets were retransmitted by the first wireless system the long time gap would be reduced to be less than the longest time it can take the second wireless system to transmit a data packet. As such, the second wireless system can transmit one or more data packets during each long time gap during which the first wireless system is not transmitting.

18 Claims, 3 Drawing Sheets

(56) References Cited

OTHER PUBLICATIONS

International Search Report and Written Opinion dated Oct. 6, 2010 for International Application No. PCT/US2010/037771.

International Preliminary Report on Patentability dated Jan. 4, 2012 for International Application No. PCT/US2010/037771.

"IEEE Recommended Practice for Information technology—Telecommunications and information exchange between systems—Local and metropolitan area networks—Specific requirements Part 15.2: Coexistence of Wireless Personal Area Networks with Other Wireless Devices Operating in Unlicensed Frequency Bands" IEEE Computer Society, [Online] Aug. 28, 2003, XP002601607 Internet Publication Retrieved from the Internet: URL: http://ieeexplore.ieee.org/stamp/stamp.jsp?tp=&arnumber=1237540> [retrieved on Jun. 14, 2010].

ROC (Taiwan) Office Action dated May 9, 2013 for ROC (Taiwan) Patent Application No. 009119541.

\* cited by examiner

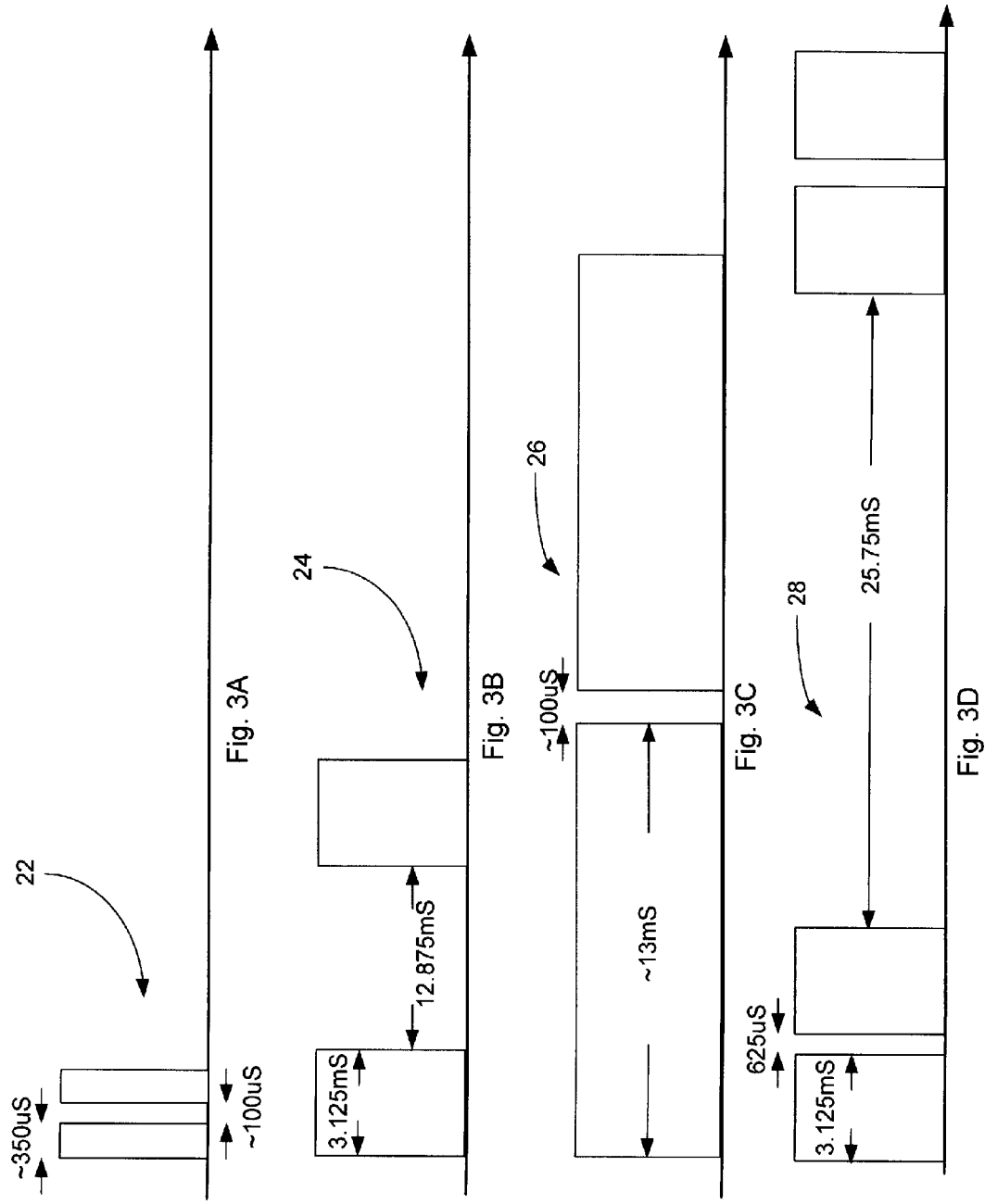

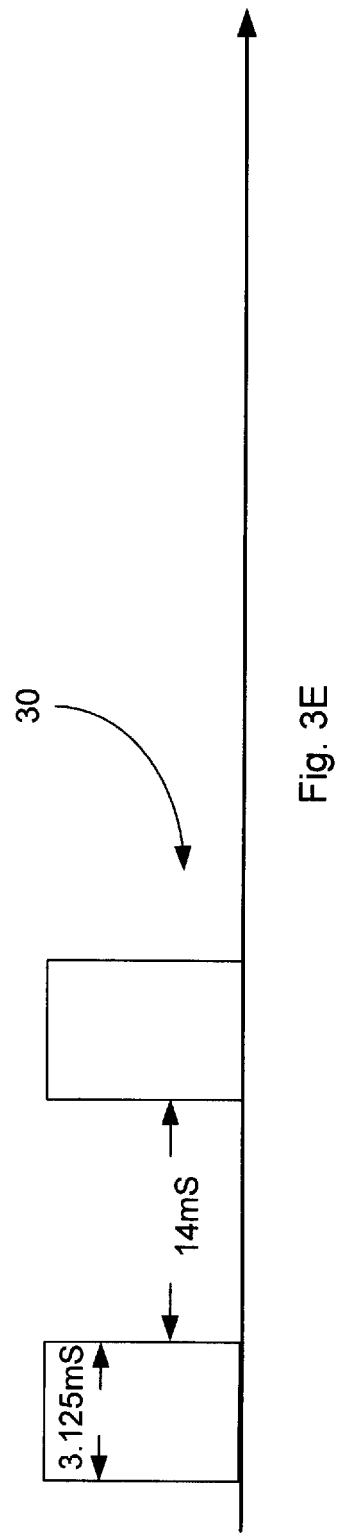

WIRELESS AUDIO COMMUNICATING METHOD AND COMPONENT

BACKGROUND

This disclosure relates to a method and component for wirelessly communicating audio data.

SUMMARY

According to a first aspect, a method of reducing interference by a first wireless audio communication system with a second wireless communication system that is different from the first wireless system is provided. The first wireless system is caused to transmit data packets with a time gap between packets during which the first wireless system is not transmitting. Periodically a long time gap between two packets of the first system is set to be at least as long as a longest time it can take the second wireless system to transmit a data packet even when packet transmission errors are occurring in the first wireless system such that if packets were retransmitted by the first wireless system the long time gap would be reduced to be less than the longest time it can take the second wireless system to transmit a data packet. As such, the second wireless system can transmit one or more data packets during each long time gap during which the first wireless system is not transmitting.

The first wireless audio communication system can be a class 1 Bluetooth wireless audio communication system. The second wireless communication system can be an 802.11 wireless communication system. The first wireless audio communication system can transmit data at a rate of at least about 220 kilobits per second. At least about every 100 milliseconds a time gap between two packets of the first wireless system can be set to be between about 14 milliseconds to about 30 milliseconds long. At least about every 100 milliseconds a time gap between two packets of the first wireless system can be set to be between about 18 milliseconds to about 27 milliseconds long. At least about every 100 milliseconds a time gap between two packets of the first wireless system can be set to be about 25.75 milliseconds long. The first wireless audio communication system can include a universal serial bus (USB) connector for connecting the first wireless system to a USB port on a computer. The first wireless audio communication system can receive electrical power and audio data through the USB connector. The long time gap can be used at least about every 100 milliseconds. The long time gap can be at least about 13 milliseconds. The long time gap between a first pair of packets of the first system can be substantially longer than a short time gap between a second pair of packets of the first system. The long time gap can be at least about 3 milliseconds longer than the short time gap. The long time gap can be at least about 6.5 milliseconds longer than the short time gap. The long time gap can be at least about 10 milliseconds longer than the short time gap.

According to a second aspect, a wireless audio communication component includes a class 1 Bluetooth transceiver, an antenna connected to the transceiver, and a universal serial bus (USB) connector connected to the transceiver. The antennae transmits data packets with a time gap between packets during which the antennae is not transmitting, at least about every 100 milliseconds a time gap between two packets is set to be between about 13 to about 16 milliseconds.

The time gap can be about 14 milliseconds. The USB connector can be for connecting the component to a USB port on a computer. The component can receive electrical power and audio data through the USB connector.

According to a third aspect, a wireless audio communication system includes a computer, a class 1 Bluetooth transceiver, an antenna connected to the transceiver, and a universal serial bus (USB) connector connected to the transceiver and the computer. The antenna transmits data packets with a time gap between packets during which the antennae is not transmitting. At least about every 100 milliseconds a time gap between two packets is set to be between about 13 to about 16 milliseconds.

According to a fourth aspect, a method of reducing interference by a first wireless audio communication system with a second wireless communication system that is different from the first wireless system, includes the step of causing the first wireless system to transmit data packets with a time gap between packets during which the first wireless system is not transmitting. Periodically a long time gap is set between a first pair of packets of the first system to be at least as long as a longest time it can take the second wireless system to transmit a data packet. The long time gap is substantially longer than a short time gap between a second pair of packets of the first system. As such, the second wireless system can transmit one or more data packets during each long time gap during which the first wireless system is not transmitting.

The long time gap can be at least about 3 milliseconds longer than the short time gap. The long time gap can be at least about 6.5 milliseconds longer than the short time gap. The long time gap can be at least about 10 milliseconds longer than the short time gap.

BRIEF DESCRIPTION OF THE DRAWINGS

FIGS. 3A-3E are diagrams of data packet transmissions for Wi-Fi and Bluetooth wireless systems.

DETAILED DESCRIPTION

A class 1 Bluetooth transceiver can wirelessly transmit stereo audio data throughout a typically sized house. When this data is received it can be used to reproduce stereo audio out loud at any location in the house. A source of this audio data can be a computer. However, when a class 1 Bluetooth transceiver is connected to a computer (e.g. via a USB connection), the transceiver can cause interference problems with a Wi-Fi wireless system that is common on computers. The description below explains how to reduce this interference.

Figure 1:
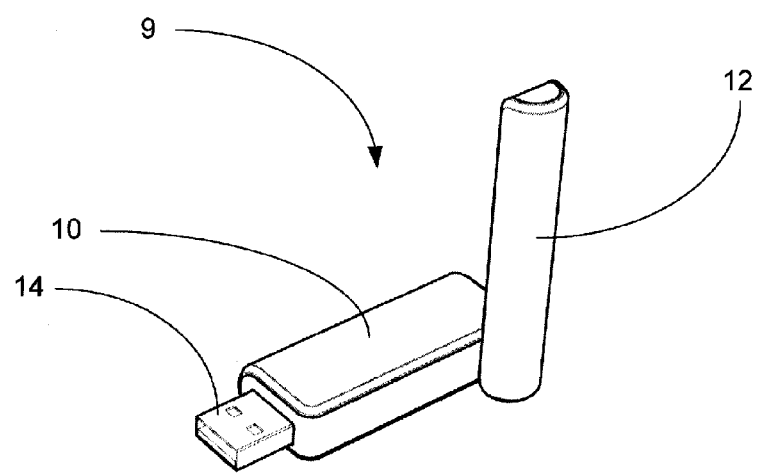
FIG. 1 is a perspective view of a class 1 Bluetooth transceiver with a universal serial bus (USB) connector and antennae.

Referring to FIG. 1, a wireless communications component 9 includes a class 1 Bluetooth transceiver 10 is connected to an antenna 12 and a USB connector 14. The transceiver 10 operates according to the Bluetooth specifications which can be found at: http://www.bluetooth.com/Bluetooth/Technology/Building/Specifications/. The transceiver 10 preferably uses the Advanced Audio Distribution Profile (A2DP) 1.2 which was published on Apr. 16, 2007 and which is available on the web page cited just above. The class 1 transceiver 10 has a range of up to about 100 meters. Using a USB connector allows electrical power and data to be supplied to the transceiver 10 via a single connection as opposed to two separate connections. This also avoids the requirement of batteries or plugging the transceiver 10 into an electrical outlet in order to power the transceiver 10.

Figure 2:
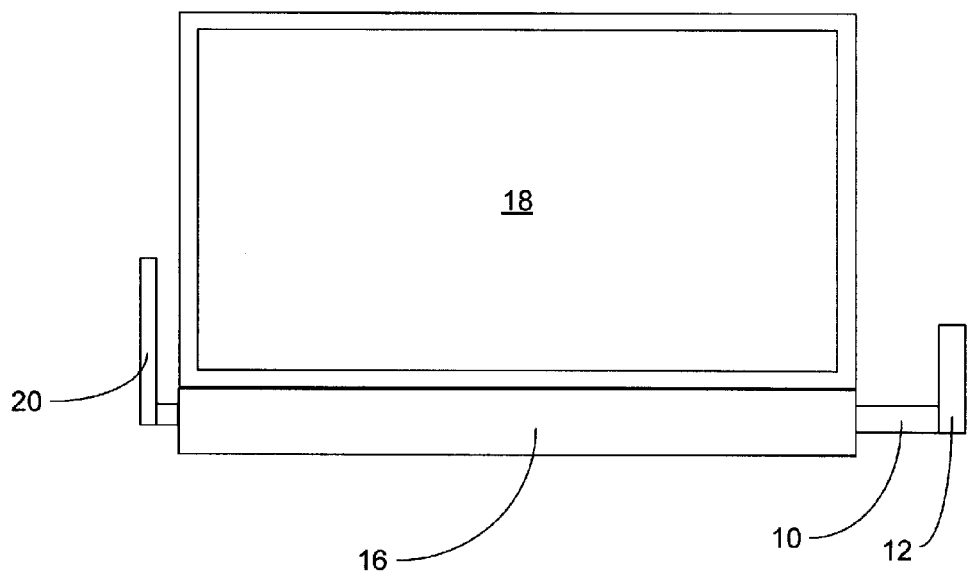
FIG. 2 is a front view of a laptop computer.

Turning to FIG. 2, a laptop computer 16 includes a video display 18 which is shown in the open position. The USB connector 14 of the Bluetooth transceiver 10 is connected to a USB port (not shown) on the side of the computer 16. Electrical power and audio data are supplied from the computer 16 through the USB port to the USB connector 14 and thus to the transceiver 10. The computer 16 includes a Wireless Fidelity (Wi-Fi) wireless data transceiver (not shown) which uses a Wi-Fi antenna 20 to transmit and receive data from, for example, a wireless router in a home. The wireless router is typically connected to the internet. The Wi-Fi system is also referred to as an 802.11 type wireless system.

Both the Wi-Fi system and the Bluetooth system operate in the same frequency band of 2.4-2.485 GHz. The Wi-Fi system uses a 20 MHz channel within the band on which to transmit and receive data packets. Each packet pair is separated by a brief period of time during which the Wi-Fi system is not transmitting. The Bluetooth system uses a spread spectrum frequency hopping arrangement in which a different 1 MHz wide channel within the band is used to transmit each data packet. The radiated Bluetooth power in the two channels adjacent to the active channel should be 20 dB less than in the active channel. Like the Wi-Fi system, each pair of data packets transmitted by the Bluetooth system is separated by a brief period of time during which the Bluetooth system is not transmitting. The use of a class 1 Bluetooth transceiver in the vicinity of a Wi-Fi transceiver (see FIG. 2) can cause interference problems with the Wi-Fi system because the Bluetooth transmitter is relatively powerful. An example of this interference is when the Bluetooth transceiver 10 is transmitting data and the Wi-Fi antennae 20 is receiving data. The way in which this interference problem is addressed is discussed below.

With reference to FIG. 3A, a portion 22 of a data packet stream for a Wi-Fi 802.11g system is shown which is operating at 54 megabits/second. In this situation the Wi-Fi system is not experiencing any interference. Each data packet takes about 350 microseconds to transmit and there is about a 100 microsecond gap between packets during which the Wi-Fi system is not transmitting. It should be noted that the information shown in FIGS. 3A-3D is not drawn to scale.

FIG. 3B displays a portion 24 of a data packet stream (e.g. an A2DP stream) for a Bluetooth system operating at about 328 kilobits/second. In this example DH5 packets are used to carry the data. Each packet takes about 3.125 milliseconds to transmit and there is about a 12.875 millisecond gap between packets during which the Bluetooth system is not transmitting. The Bluetooth system of FIG. 3B will interfere with the Wi-Fi system of FIG. 3A because there are periods of time when both systems are transmitting simultaneously, and even though the Bluetooth signal may be using a different frequency from the Wi-Fi signal at that specific time, the high power Bluetooth can overwhelm the Wi-Fi receiver. The Wi-Fi system sees this interference as if the Wi-Fi system was at about the limit of its transmission range and reacts by slowing down its data transmission rate.

In FIG. 3C a portion 26 of a data packet stream for the Wi-Fi system is shown after the Wi-Fi system has slowed its data transmission rate down from 54 megabits/second (see FIG. 3A) to a lowest data rate of 1 megabit/second. As a result, each Wi-Fi packet now takes about 13 milliseconds to transmit and there is still about a 100 microsecond gap between packets. The interference problem between the Wi-Fi system of FIG. 3C and the Bluetooth system of FIG. 3B is even worse now because there are greater amounts of time when both systems are transmitting simultaneously.

Turning to FIG. 3D, a portion 28 of a data packet stream for the Bluetooth system is shown after the data packets have been clustered together to create a long time gap of 25.75 mS when the Bluetooth system is not transmitting while maintaining substantially the original data rate of 328 kilobits/second. The clustered Bluetooth packets have a short time gap between them of 625 microseconds. As such, the long time gap between some Bluetooth packet pairs is substantially longer than the short time gap between other Bluetooth packet pairs. This long time gap should (a) preferably be at least about 3 mS longer than this short time gap, (b) more preferably be at least about 6.5 mS longer than this short time gap, and (c) most preferably be at least about 10 mS longer than this short time gap. The long time gap is preferably less than about 30 mS. The long time gap between packets should be at least about 13 mS long to allow time for the Wi-Fi system to transmit its data packets in the worst case situation of 13 mS/packet.

In another example shown in FIG. 3E, the Bluetooth data rate has been reduced from 328 kilobits/second (see FIG. 3B) to 309 kilobits/second. The appropriate data rate (e.g. 309 kilobits/second) has been selected to space out the packets 30 evenly so that there is about a 14 mS gap between each packet pair during which the Bluetooth system is not transmitting. This consistent time gap between each packet pair is preferably set to be somewhere between about 13 mS to about 16 mS. As such, the Wi-Fi system can transmit one or more of its data packets between the Bluetooth packets, and thereby reduce or eliminate the interference issue.

Regarding FIGS. 3D and 3E, the data rate is preferably at least about 220 kilobits/second. At least about every 100 milliseconds there should be a long time gap of at least about 13 milliseconds during which the Bluetooth system is not transmitting. There is a tradeoff between (a) increasing the length of the long time gap to decrease the chance of interference with the Wi-Fi system, and (b) decreasing the length of the long time gap in order to be able to have a higher data transmission rate. The Wi-Fi system has the opportunity of communicating during these long time gaps. The longest time it can take a Wi-Fi data packet to be transmitted is about 13 milliseconds. As such, the Wi-Fi data packets and Bluetooth data packets can be transmitted at different times without interfering with each other. The Bluetooth system is setup to address the worst case interference issue (i.e. the Wi-Fi system slowing down to 1 megabit/second) with the Wi-Fi system.

The Bluetooth system also addresses interference problems by (a) not using one or more channels on which interference is occurring, and/or (b) retransmitting a data packet when the packet is not properly received at a receiving station. The receiving station reports back to transceiver 10 that there has been an error in receiving a particular data packet. The transceiver 10 then retransmits this data packet. If too many Bluetooth data packets are retransmitted, this can cause the periodic long time gap between Bluetooth packets to be reduced to a point where interference between the Bluetooth and Wi-Fi systems can commence and increase to an unacceptable level. This issue is addressed by not retransmitting Bluetooth data packets if such retransmission will cause the Bluetooth large time gap to become less than 13 milliseconds. In other words, a long time gap between two Bluetooth packets is periodically set to be at least as long as a longest time it takes the Wi-Fi system to transmit a data packet even when packet transmission errors are occurring in the Bluetooth system such that if Bluetooth packets were retransmitted the long time gap would be reduced to be less than the longest time it takes the Wi-Fi system to transmit a data packet. As such, the Wi-Fi system can transmit one or more data packets during each long time gap during which the Bluetooth system is not transmitting.

What is claimed is:

1. A method of reducing interference by a first wireless audio communication system with a second wireless communication system that is different from the first wireless system, comprising the steps of:

causing the first wireless system to transmit data packets with a time gap between packets during which the first wireless system is not transmitting; and periodically setting a long time gap between two packets of the first system to be at least as long as a longest time it can take the second wireless system to transmit a data packet even when packet transmission errors are occurring in the first wireless system such that if packets were retransmitted by the first wireless system the long time gap would be reduced to be less than the longest time it can take the second wireless system to transmit a data packet, whereby the second wireless system can transmit one or more data packets during each long time gap during which the first wireless system is not transmitting.

2. The method of claim 1, wherein the first wireless audio communication system is a class 1 Bluetooth wireless audio communication system.

3. The method of claim 1, wherein the second wireless communication system is an 802.11 wireless audio communication system.

4. The method of claim 1, wherein the first wireless audio communication system transmits data at a rate of at least about 220 kilobits per second.

5. The method of claim 1, wherein at least about every 100 milliseconds a time gap between two packets of the first wireless system is set to be between about 14 milliseconds to about 30 milliseconds long.

6. The method of claim 1, wherein at least about every 100 milliseconds a time gap between two packets of the first wireless system is set to be between about 18 milliseconds to about 27 milliseconds long.

7. The method of claim 1, wherein at least about every 100 milliseconds a time gap between two packets of the first wireless system is set to be about 25.75 milliseconds long.

8. The method of claim 1, wherein the first wireless audio communication system includes a universal serial bus (USB) connector for connecting the first wireless system to a USB port on a computer.

9. The method of claim 8, wherein the first wireless audio communication system receives electrical power and audio data through the USB connector.

10. The method of claim 1, wherein the long time gap is used at least about every 100 milliseconds.

11. The method of claim 1, wherein the long time gap is at least about 13 milliseconds.

12. The method of claim 1, wherein the long time gap between a first pair of packets of the first system is substantially longer than a short time gap between a second pair of packets of the first system.

13. The method of claim 12, wherein the long time gap is at least about 3 milliseconds longer than the short time gap.

14. The method of claim 12, wherein the long time gap is at least about 6.5 milliseconds longer than the short time gap.

15. The method of claim 12, wherein the long time gap is at least about 10 milliseconds longer than the short time gap.

16. A method of reducing interference by a first wireless audio communication system with a second wireless communication system that is different from the first wireless system, comprising the steps of:

causing the first wireless system to transmit data packets with a time gap between packets during which the first wireless system is not transmitting; and periodically setting a long time gap between a first pair of packets of the first system to be at least as long as a longest time it can take the second wireless system to transmit a data packet, the long time gap being at least about 3 milliseconds longer than a short time gap between a second pair of packets of the first system, whereby the second wireless system can transmit one or more data packets during each long time gap during which the first wireless system is not transmitting, wherein the long time gap is at least as long as a longest time it can take the second wireless system to transmit a data packet even when packet transmission errors are occurring in the first wireless system such that if packets were retransmitted by the first wireless system the long time gap would be reduced to be less than the longest time it can take the second wireless system to transmit a data packet.

17. The method of claim 16, wherein the long time gap is at least about 6.5 milliseconds longer than the short time gap.

18. The method of claim 16, wherein the long time gap is at least about 10 milliseconds longer than the short time gap.

* * * * *